United States Patent [19]

Park

[11] Patent Number: 5,694,421
[45] Date of Patent: Dec. 2, 1997

[54] FREQUENCY-SELECTIVE INTERFERENCE SIGNAL DETECTING APPARATUS AND METHOD THEREOF

[75] Inventor: Il-keun Park, Suwon, Rep. of Korea

[73] Assignee: Samsung Electronics Co., Ltd., Suwon, Rep. of Korea

[21] Appl. No.: 575,399

[22] Filed: Dec. 20, 1995

[30] Foreign Application Priority Data

Mar. 17, 1995 [KR] Rep. of Korea .................. 95-5602

[51] Int. Cl.[6] .................................................. H04B 3/46
[52] U.S. Cl. .................. 375/227; 375/285; 375/296; 375/346; 375/349; 370/201; 370/252; 455/63; 455/67.3; 455/226.3; 455/295; 455/303
[58] Field of Search .............................. 375/224, 227, 375/260, 285, 296, 340, 346, 349; 379/119, 120, 6; 370/201, 252; 455/501, 504, 506, 63, 65, 67.1, 67.3, 67.4, 67.7, 70, 226.3, 295, 296, 303

[56] References Cited

U.S. PATENT DOCUMENTS 5,375,166  12/1994  Odaohara ........................ 379/97
5,519,730  5/1996  Jasper et al. ................... 375/260
5,519,731  5/1996  Cioffi ............................ 375/260
5,559,834  9/1996  Edler ............................ 375/285

*Primary Examiner*—Stephen Chin
*Assistant Examiner*—Amanda T. Le
*Attorney, Agent, or Firm*—Burns, Doane, Swecker & Mathis, L.L.P.

[57] ABSTRACT

A frequency-selective interference signal detecting apparatus and method thereof generates as many tone signals as the number of a frequency-selective interference signals at the transmission side of a transmission system and one tone signal corresponding to an optional frequency at an occupied band frequency of the transmission system, transmits all generated tone signals to a receiving side of the transmission system through the transmission channel selectively, computes an SNR with regard to each tone signal by receiving these tone signals at the receiving side, compares the calculated SNR with a preestablished reference value, detects whether or not each of the frequency-selective interference signals exist, provides the degree of such interference, and makes several frequency-selective interference signals detectable so as to raise transmission efficiency of a data signal in the transmission system.

6 Claims, 6 Drawing Sheets

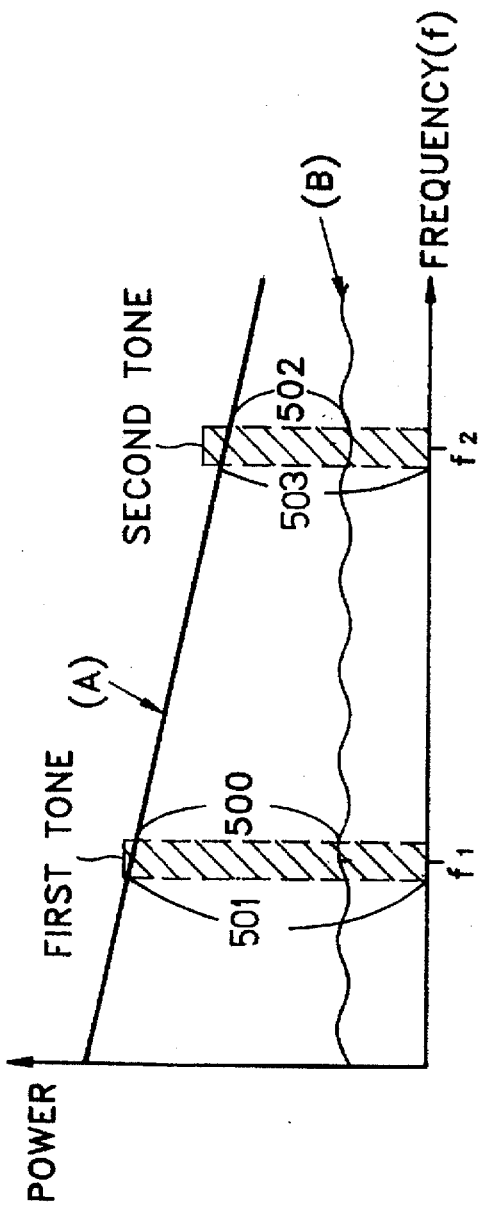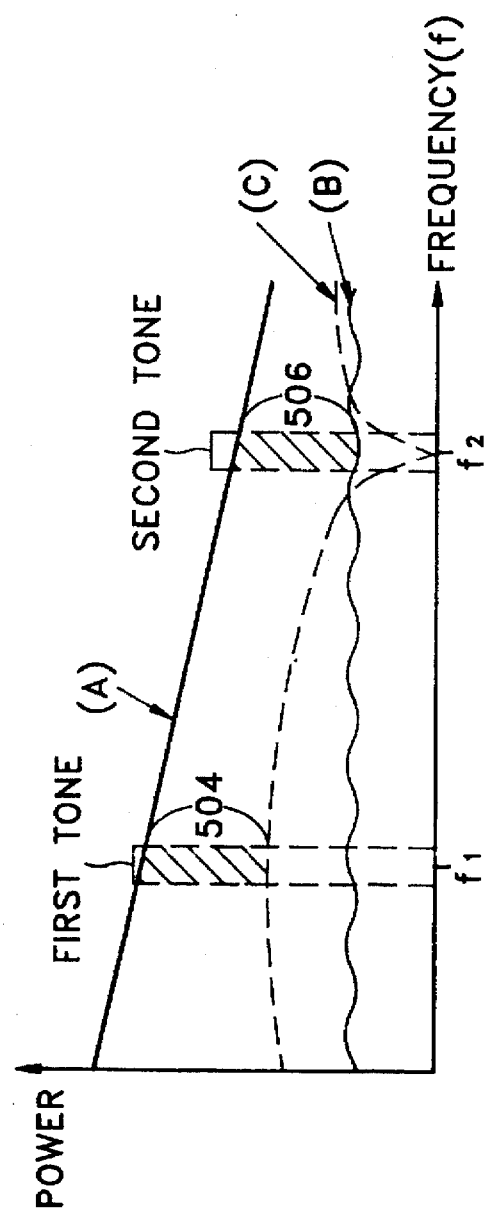

FREQUENCY-SELECTIVE INTERFERENCE SIGNAL DETECTING APPARATUS AND METHOD THEREOF

BACKGROUND OF THE INVENTION

The present invention relates to digital transmission and, more particularly, to an apparatus and method for detecting whether an interference signal having a frequency-selective amplitude characteristic, that is a signal from another transmission system or noise, flows into a transmission channel which a target transmission system uses.

To meet current demand for information transmission, which is on the increase, a system is needed that is able to transmit data at high speed.

In wireless transmission systems it is extremely difficult to satisfy. That increasing demand for high speed transmission due to the limitation of frequency resources. To solve this problem, there is a great deal of technological research, for example, into "frequency reuse" technology. This technology involves dividing up one region into several zones, limiting the distance feasible for wireless communication by limiting the power of transmission in each zone, and provides a communication service by re-using the frequency used in the one zone in another zone. At this time, when zones using same frequency are close proximity, communication may experience interference from a noise signal flowing into the target transmission channel.

In a wire transmission system, since the channel is a line, to avoid a signal overlapping with other systems, the signals are separated mainly by using separate lines. Namely, if different lines are used, the signals do not overlap each other, even though the same frequency bands are used simultaneously. However, many other transmission systems for providing several services according to the increase in information quantity, exist in a closed line. Therefore, there is a problem that interference signals from other lines infiltrate in a target line. Namely, a crosstalk phenomena is generated.

The crosstalk phenomena occurs most seriously in a transmission system using a T1 carrier wave which transmits data at a transmission speed of 1.544 Mb/s. Currently, a data signal is transmitted at high power from the transmitting end to repeaters installed at several points along the line which amplify the data signal and re-transmit it. This is for reducing the loss of transmitted data due to resistance loss occurring in the line, which is due to increased transmission distance. Since crosstalk in the T1 carrier wave is approximately the same at any position in the transmission wire and appears with high power, the crosstalk signal is a serious interference signal to other lines.

Among several interference signals, the interference signal caused by a transmission channel of other systems usually has a frequency-selective characteristic. Namely, a crosstalk signal has a constant occupied frequency band width, having a maximum power point in the middle portion of this occupied frequency band, minimum power point at the end portions. FIG. 1 is a graph showing the degree of power distribution of the crosstalk signal by a fully described T1 carrier wave, where the vertical axis indicates the power spectral density, and the horizontal axis indicates the frequency. As shown in FIG. 1, the crosstalk signal by the T1 carrier wave has a maximum power point in the neighborhood of 700 KHz and a minimum power point in the neighborhood of 1.5 MHz according to the characteristic of the T1 carrier wave. Interference signals having such amplitude characteristics are referred to as "frequency-selective interference signals" hereinafter in order to compare it with an thermal noise, etc. having flat amplitude characteristic over the entire frequency band.

In the case where the frequency-selective interference signal exists in a transmission channel, in the prior art an equalization method and a power mask method have been utilized to raise the effective data transmission rate by eliminating or overcoming the interference signal.

The equalization method is a method for finding the original transmission signal by using the fact that the impulse response of a receiving signal distorted by the noise component from the interference phenomena does not cross any zero point each symbol period.

The power mask method is a method for locally increasing the transmitting power of a portion that is influenced more by noise by examining the amount of the noise component by the interference phenomena from a received signal. However, the described methods of the prior art have the problem that the effective data transmission rate cannot be maximized because of examining the amount of all noise components instead of that of a specified interference signal for effective data transmission.

SUMMARY OF THE INVENTION

It is an object of the present invention to solve the above problems by providing a frequency-selective interference signal detecting apparatus for precisely detecting whether frequency-selective interference signal exists as a specific interference signal in a transmission channel.

It is another object of the present invention to provide a frequency-selective interference signal detecting method for the frequency-selective interference signal detecting apparatus.

It is still another object of the present invention to provide a frequency-selective interference signal detecting apparatus and a method thereof for measuring the amount of frequency-selective interference signals existing in a transmitting channel.

It is yet another object of the present invention to provide a frequency-selective interference signal detecting apparatus and method thereof able to detect all of several frequency-selective interference signals in the case that those signals exist in a transmission channel simultaneously.

To accomplish the above objects, the present invention provides a frequency-selective interference signal detecting apparatus for use in a transmission system having: transmitting means for inputting and modulating a data signal for transmission, and outputting the modulated data signal; a transmission channel through which the output of the transmission passes; and receiving means for demodulating to the original data signal by inputting a signal passed through the transmission channel and outputting the demodulated data signal.

The frequency-selective interference signal detecting apparatus comprising tone signals generating means for getting a first tone signal and N second tone signals corresponding to N frequency-selective interference signals respectively, adding each, and outputting the sum result, selecting means for inputting signals output from the tone signal generating means in response to a control signal, and outputting selectively a input signal; signal combining means for combining output signal of the selecting means and the transmission means, and outputting the combined signal to the transmission channel; tone signal-to-noise ratio (SNR) computing means for inputting a signal passed through the transmission channel, getting a first tone SNR and a second tone SNR which are the signal-to-noise ratio corresponding to the first and the second tone signals respectively, subtracting each of N second tone SNRs from the first tone SNR, and outputting N difference results, and reference comparing means for comparing the N difference results with preestablished N reference SNRs with regard to each of the N difference results, and outputting N existence signals indicating that the frequency-selective interference signal exists.

To accomplish the other object the present invention provides, a frequency-selective interference signal detecting method for use in a transmission system having transmission means for inputting a data signal for transmission, modulating the input signal, and outputting the modulated signal, a transmission channel through which an output of the transmission means passes, and receiving means for inputting a signal passed through the transmission, demodulating as the original data signal, and outputting the demodulated data signal.

The frequency-selective interference signal detecting method comprises the sequential steps of generating a first tone signal and N second tone signals corresponding to N frequency-selective interference signals respectively; first determining whether the frequency-selective interference signal is a tone signals; first combining the first tone signal and all the second tone signals if the first determining step is satisfied; generating the rest of the second tone signal if the first determining step is not satisfied; proceeding to the generating step if all the second tone signals are generated and otherwise proceeding to the first combining step, second determining continuously whether the first and N second tone signals are transmitted to the transmission channel after the first combining step; second combining the modulated signal with the first and the N second tone signals when the tone signals are transmitted and transmitting to the transmission channel; first computing the first tone signal corresponding to the first tone signal from signals passed through the transmission channel; second computing N second tone SNRs corresponding to the N second tone signals from signals passed through the transmission channel; subtracting the N second tone SNR from the first tone SNR respectively and obtaining N difference SNRs; and third comparing the N difference SNRs with preestablished N reference values respectively and generating N existence signals indicating whether the frequency-selective interference signal exists.

BRIEF DESCRIPTION OF THE DRAWINGS

The above objects and advantages of the present invention will become more apparent by describing in detail a preferred embodiment thereof with reference to the attached drawings in which:

FIG. 4 is a frequency graph showing operation of apparatus according to the present invention when the frequency-selective interference signal does not exist;

FIG. 5 is a frequency graph showing operation of apparatus according to the present invention when one frequency-selective interference signal exists.

DETAILED DESCRIPTION OF THE INVENTION

Figure 1:
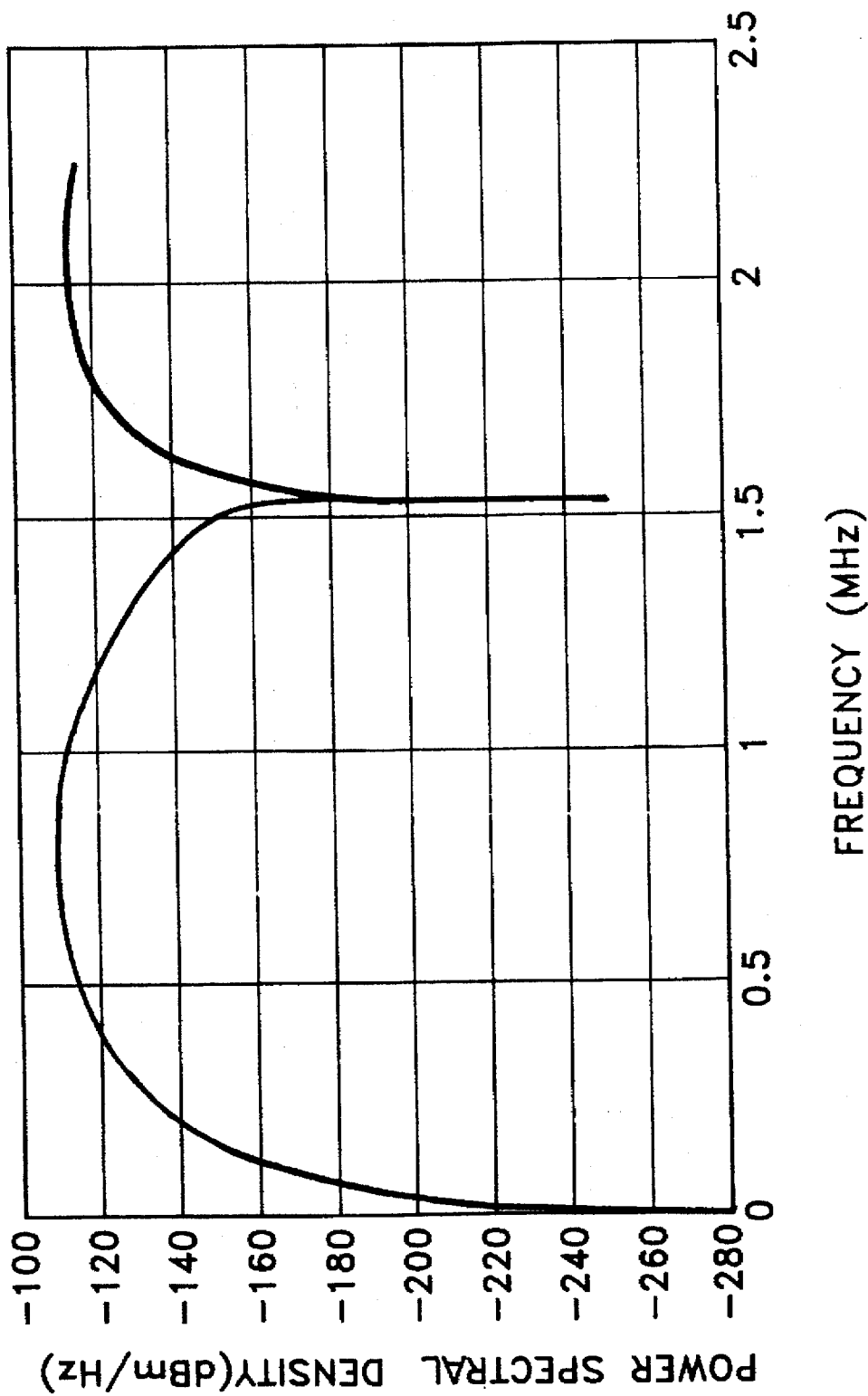
FIG. 1 is a power distribution graph of a crosstalk phenomenon generated by a T-1 carrier wave.
Figure 2:
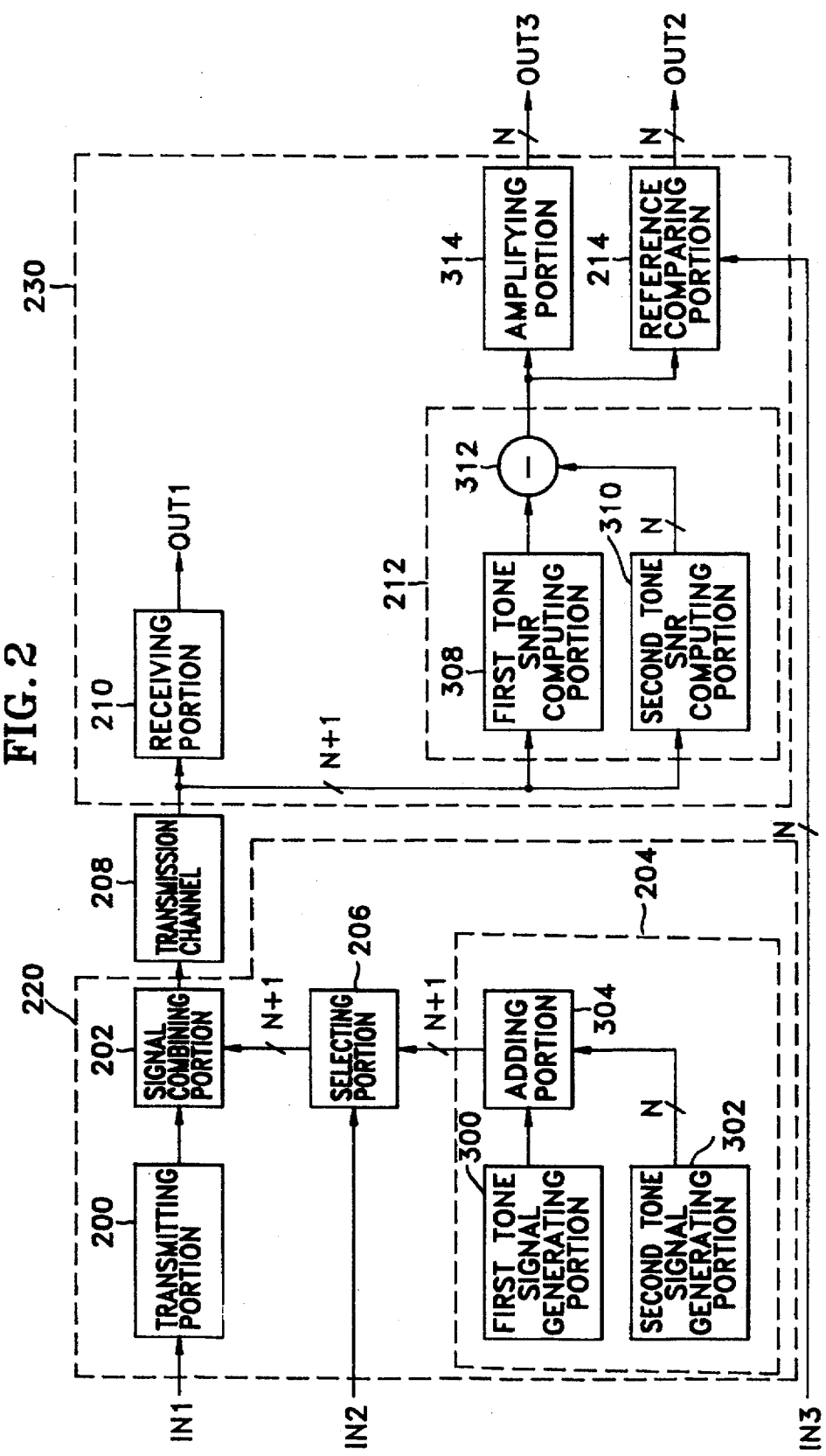
FIG. 2 is a detailed block diagram of a frequency-selective interference signal detecting apparatus according to the present invention.

A frequency-selective interference signal detecting apparatus in FIG. 2 includes a transmitting portion 200, a signal combining portion 202, a selecting portion 206, a transmission channel 208, a receiving portion 210, a first tone signal generating portion 300, a second tone signal generating portion 302, an adding portion 304, a first tone SNR computing portion 308, a second tone SNR computing portion 310, a subtracting portion 312, a reference comparing portion 214 and an amplifying portion 314.

Figure 3A:
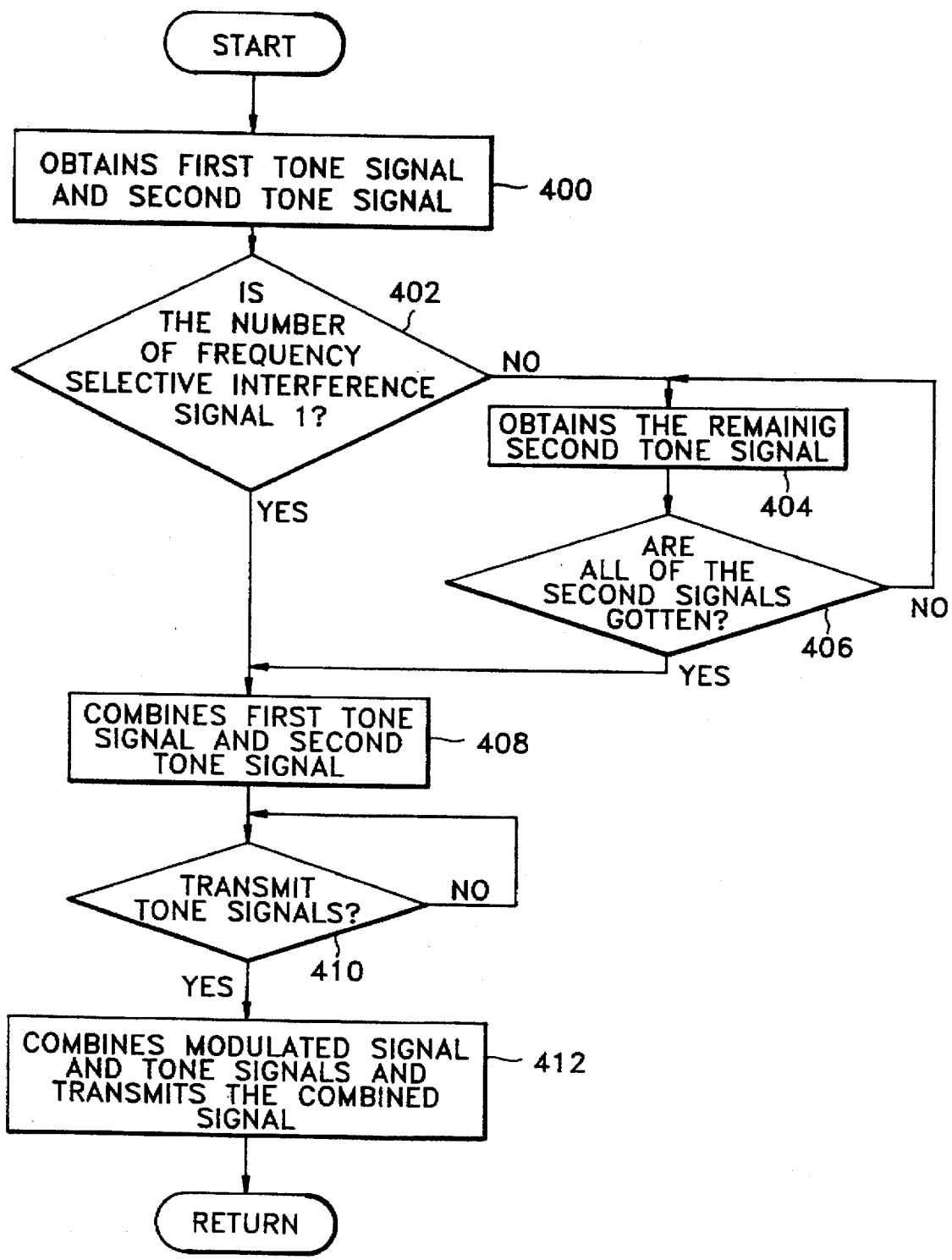
FIG. 3A and FIG. 3B are flow charts for explaining a frequency-selective interference signal detecting method according to the present invention.

FIG. 3A is a flow chart to explain a frequency-selective interference signal detecting method executed at a transmitting side 220 of a transmission system according to one embodiment of the present invention.

Figure 3B:
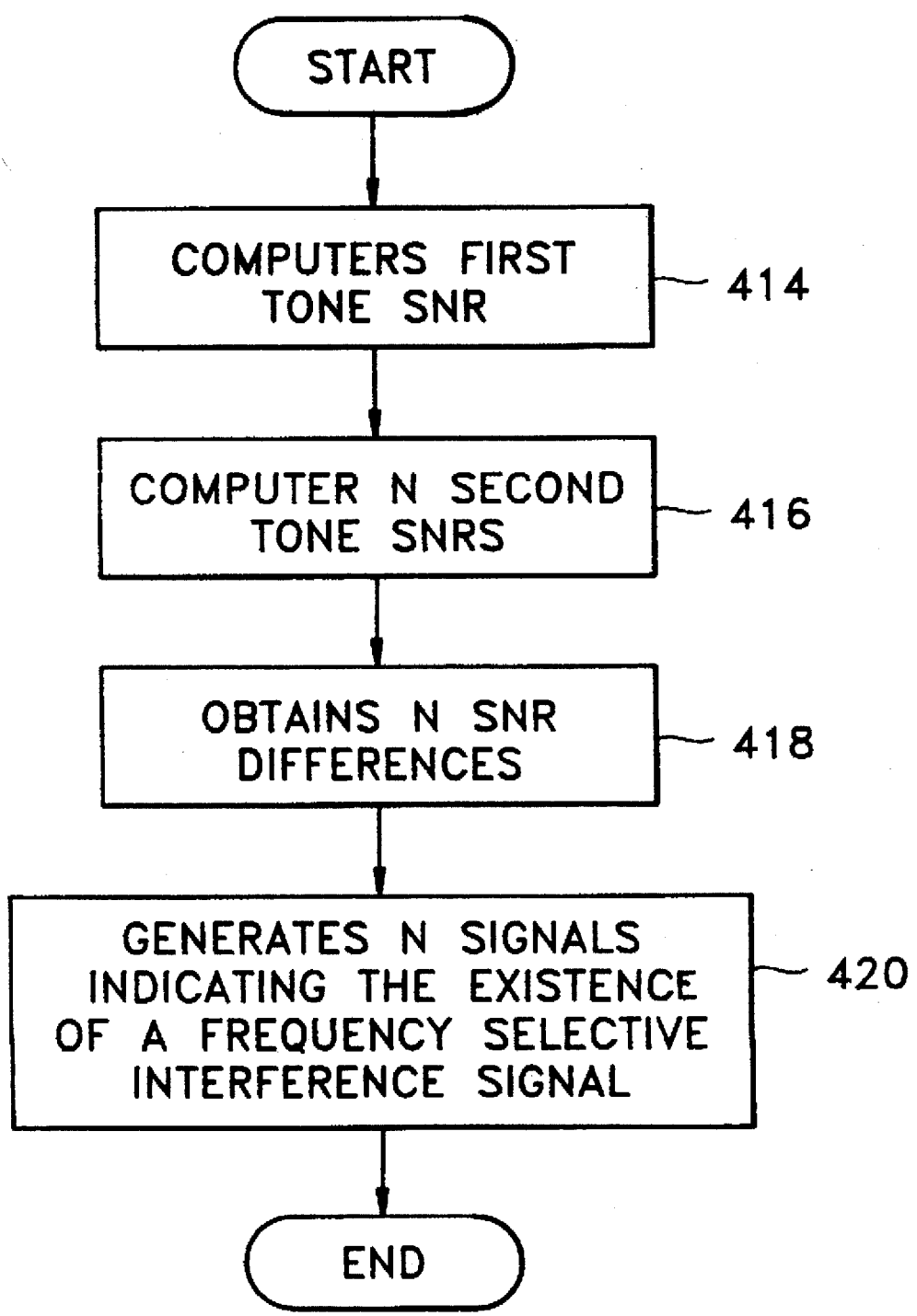

FIG. 3B is a flow chart to explain the frequency-selective interference signal detecting method executed at a receiving side 230 of the transmission system according to one embodiment of the present invention.

Hereinafter, a detailed structure of a frequency-selective interference signal detecting apparatus will be explained in detail with reference to FIG. 2.

The transmitting portion 200 shown in FIG. 2 receives a data signal which will be transmitted, modulates the received data signal, and outputs the modulated data signal. The output of transmitting portion 200 is input to a receiving portion 210 through a transmission channel 208. The receiving portion 210 restores the input data to the original data signal and outputs the restored data signal through an output terminal OUT1.

In FIG. 2 the, tone signal generating portion 204 includes a first tone signal generator 300 for generating a first tone signal, a second tone signal generator 302 for generating N second tone signals, and an adder 304 for summing the first tone signal and the N second tone signals and outputting the summed result. The first tone signal generated from the first tone signals generating portion 300 and the second tone signal generated from the second tone signal generating portion 302 can be outputted to the adding portion 304 simultaneously or sequentially according to the characteristic of a transmission system.

Further in the receiving side 230, a tone SNR computing portion 212 includes a first tone SNR computing portion 308 for receiving a signal through a transmission channel 208, detecting the first tone signal, and outputting a first tone SNR therefrom which is a SNR of a frequency band corresponding to the first tone signal. The tone SNR computing portion 212 also includes second tone SNR computing portion 310 for receiving a signal through transmission channel 208, detecting the N second tone signals, and outputting N second tone SNRs which are the SNRs corresponding to each of the second tone signals. The tone SNR computing portion 212 further includes subtracting portion 312 for subtracting each of the N second tone signal SNR from the first tone SNR, and outputting N values of the difference result. The frequency-selective interference signal detecting apparatus further includes amplifying portion 314 which amplifies the output of subtracting portion 312 to a predetermined level, and outputs the amplified value through an output terminal OUT3.

A frequency-selective interference signal detecting apparatus and method thereof according to the present invention will be explained as follows.

The first tone signal generating portion 300 shown in FIG. 2 calculates and generates the first tone signal, a single tone, with regard to one frequency inside an occupied frequency band width which a transmission system uses. The second tone signal generating portion 302 is composed of N (where N is the number of the frequency-selective interference signal which will be detected) signal tone circuits which generate a single tone corresponding to the point where the strength of a frequency-selective interference signal is getting smaller with regard to each of the frequency-selective interference signals, computes and generates 2-1 through 2-N tone signals (where "2" denotes a signal by the second generating portion) (step 400 in FIG. 3A). At this time, it is determined whether the number of the frequency-selective interference signal is one (step 402 in FIG. 3A). If the number (N) of the frequency-selective interference signals is only one, adding portion 304 combines the first tone signal and the 2-1 tone signal and outputs the combined signal (step 408 in FIG. 3A). If the number of the frequency-selective interference signal is two or more, second tone signal generating portion 302 obtains remaining second tone signal (step 404 in FIG. 3A). If all remaining 2-2 through 2-N tone signals are received (step 406 in FIG. 3A), all tone signals are combined by adding portion 304 which outputs the combined signal to selecting portion 206. A control signal input to selecting portion 206 through input terminal IN2 selectively determines whether transmission of combined tone signals output from adding portion 304 through transmission channel 208 occurs, and prevents the loss of a data signal input from terminal IN1 due to tone signals to be transmitted. Namely, where the frequencies of the first tone signal and the 2-1 through 2-N tone signals are in the working frequency band for transmitting the data signal, the selecting portion 206 selects the tone signals and outputs the selected tone signals to the signal combining portion 202 only during initialization or signal transmission interruption for a short period responding to the control signal input from terminal IN2. If the frequencies of the first tone signal and the 2-1 through 2-N signals have nothing to do with the working frequency band or if the relation therebetween is no problem, a control signal can be generated to transmit the tone signal selectively only when the frequency-selective interference signal detection is necessary. When the tone signal selected by the control signal is transmitted through the transmission channel 208 (if step 410 in FIG. 3A is satisfied), the signal combining portion 202 combines a data signal modulated at the transmission portion 200 and the tone signal, and transmits the combined signal through the transmission channel 208 at a transmitting power amplified at the transmitting portion 200 (step 412 in FIG. 3A).

Next, the first tone SNR computing portion 308 in receiving side 230 inputs a signal passed through the transmission channel 208, detects the first tone signal, computes the SNR of the frequency band which the first tone signal occupies (step 414 in FIG. 3B), and outputs the first tone SNR. The second tone SNR computing portion 310 inputs the signal passed through the transmission channel 208, detects the 2-1 through 2-N tone signals, computes the SNRs of the frequency band that these signals occupy, and outputs N second tone SNRs (step 416 in FIG. 3B). The subtracting portion 312 shown in FIG. 2 deducts the 2-1 tone SNR from the first tone SNR to obtain first difference SNR, deducts 2-2 tone SNR from the first tone SNR to obtain second difference SNR and obtain the next difference SNR by the same method. Finally, the portion 312 outputs the N difference SNRs (step 418 in FIG. 3B). The reference computing portion 214 inputs N reference values corresponding to the N difference SNRs through input terminal IN3, compares the N reference values with the corresponding difference SNR values respectively, and if the difference SNR is smaller than the reference value, determines that the frequency-selective interference signal exists, and if not, determines that the frequency-selective interference signal does not exist, and outputs N existence signals indicating the existence or lack of the frequency-selective interference signal through an output terminal OUT2 (step 420 in FIG. 3B). Since values of the reference signals can be changed according to the structure of the transmission system, transmission output or the circumstance of the transmission channel, the values of the reference signals are preestablished at a suitable value through experiments on each system. Also, a user judges the size of the frequency-selective interference signal and judges the degree of interference of the interference signal by using the signal output through the output terminal OUT3 of amplifying portion 314.

FIG. 4 is a frequency graph explaining the operation of an apparatus of the present invention where no frequency-selective interference signals exist, reference number 500 indicates the first tone SNR, and 502 indicates the second tone SNR.

FIG. 5 is a frequency graph explaining the operation of an apparatus according to the present invention where one frequency-selective interference signals exists, the reference numeral 504 indicates the first tone SNR and the reference number 506 indicates the second tone SNR.

Figure 6:
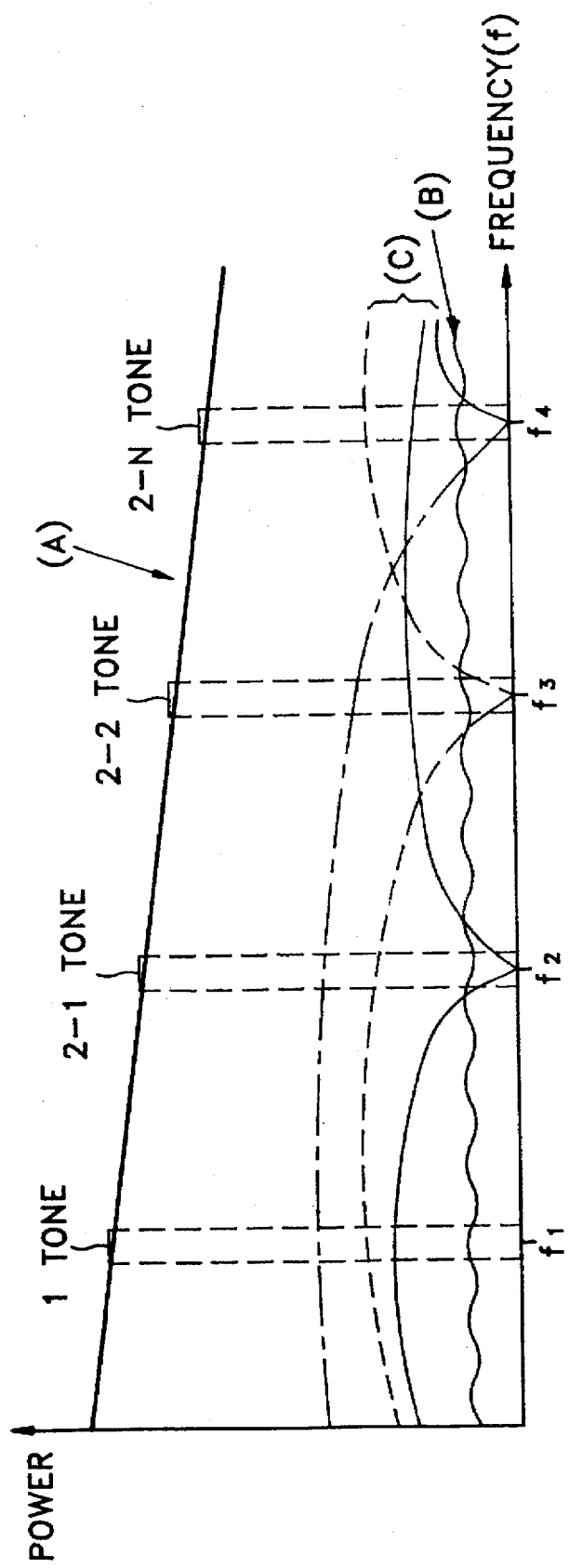
FIG. 6 is a frequency graph showing the operation of apparatus according to the present invention when several frequency-selective interference signal exist.

In FIGS. 4, 5 and 6, A indicates a channel characteristic, B indicates a noise characteristic, and C indicates a characteristic of frequency-selective interference signal.

An operation principle of the frequency-selective interference signal detecting apparatus according to the present invention will be explained in detail as follows with reference to FIGS. 4, 5 and 6.

When detecting one frequency-selective interference signal, first and second tone signal generating portion (300 and 302) generate only one tone signal, respectively. After being selected at selecting portion 206 responding to a control signal, the two tone signals are combined with a data signal at signal combining portion 202 and then combined signals are transmitted through transmission channel 208. Signals passing through transmission channel 208 are input to first and second tone SNR computing portion (308 and 310), and the first and the second tone SNR of SNRs with regard to each tone are computed. There are several methods to compute the SNR of a received signal in a desired frequency band, and one of these methods will be explained as follows.

Firstly, when a transmission signal does not exist completely, a noise power existing in an target frequency band for measuring SNR is calculated. When the transmission signal exists, a total power existing in the target frequency band for measuring the SNR is calculated. The total power is the signal power plus the noise power, the noise power is deducted from the total power to calculate the signal power. If the signal power obtained the signal power is divided by the noise power in order to calculate the SNR.

As shown in FIG. 4, if the frequency-selective interference signal does not exist in transmission channel 208, one first and one second tone signals exist, and the loss of signal at the high frequency of the channel is greater than that at the low frequency in the case of white noise (B), the first tone SNR becomes greater than the second tone SNR. Namely, The value subtracted in subtracting portion 312 depends on the loss characteristic of the signal according to the frequency band on the channel.

Secondly, when the frequency-selective interference signal shown in FIG. 5 as a dotted line exists in transmission channel 208 with the above assumption, since the noise signal has a frequency-selective characteristic, a value computed at subtracting portion 312 depends approximately on the frequency-selective interference signal and the loss characteristic according to the frequency band of the channel. Since the noise power inside a transmission band has a frequency-selective characteristic, the first tone SNR becomes smaller than a value obtained when the frequency-selective interference signal does not exist. However, since the second tone signal is established on a portion where a signal strength of the frequency-selective interference signal becomes smaller, the noise power calculated at the second tone SNR computing portion 310 is smaller than that calculated at the first tone SNR computing portion 308. Accordingly, the first tone SNR becomes smaller when the frequency-selective interference signal exists than when only flat noise exists and the second tone SNR does not nearly change in the above two cases. Therefore, a "difference SNR value" (a value obtained by subtracting second SNR from the first SNR) calculated at the subtracting portion 312 becomes smaller than a value obtained when only flat noise exists. A value output from the subtracting portion 312 is input to the reference comparing portion 214, and compared with a reference value input from terminal IN3. When a value output from the computing portion 312 is smaller than the reference value, an "existence signal" indicating that the frequency-selective interference signal exists, is generated at the reference comparing portion 214. Also, the amplifying portion 314 shown in FIG. 2 inputs a difference SNR from the subtracting portion 312, converts the inputted signal to a level and shape that a user wants and outputs the converted signal through the output terminal OUT3. Thus, the frequency-selective interference signal detecting apparatus according to the present invention is provided so that the user can judge the degree of interference of the frequency-selective interference signal.

Meanwhile, when several frequency-selective interference signals exist to be detected as shown in FIG. 6, the frequency-selective interference signal detecting apparatus detects several existence signals corresponding to each of the frequency-selective interference signals as above, and can inform the interference degree of these signals to the user by the above stated operation principle.

As detailed above, the frequency-selective interference signal detecting apparatus and method thereof according to the present invention detects more accurately whether or not a frequency-selective interference signal exists in the target transmission channel than a prior detecting apparatus and method thereof, provides the degree of the interference signal so that the interference signal can be removed effectively, and maximizes transmission efficiency by detecting several frequency-selective interference signals.

As will be understood by those skilled in the art, the above exemplary embodiments are illustrative and not restrictive of the scope of the present invention. The scope of the present invention is to be determined by the appended claims and equivalents thereof.

What is claimed is:

1. A frequency-selective interference signal detecting apparatus for use in a transmission system including: transmitting means for inputting and modulating a data signal for transmission and outputting the modulated data signal; a transmission channel through which the output of said transmission means passes; and receiving means for demodulating to the original data signal by inputting a signal passed through said transmission channel, and outputting the demodulated data signal, said frequency-selective interference signal detecting apparatus comprising:

tone signal generating means for generating a first tone signal and N second tone signals corresponding to N frequency-selective interference signals, respectively, adding each, and outputting a sum result;

selecting means for inputting signals outputted from said tone signal generating means in response to a control signal and selectively outputting an input signal;

signal combining means for combining output signals of said selecting means and said transmission means, and outputting a combined signal to said transmission channel;

tone signal-to-noise ratio computing means for inputting a signal passed through said transmission channel, generating a first tone signal-to-noise ratio and a second tone signal-to-noise ratio which are the signal-to-noise ratio corresponding to said first and second tone signals, respectively, subtracting each of N second tone signal-to-noise ratio from said first tone signal-to-noise ratio, and outputting N difference results; and reference comparing means for said N difference results with a preestablished N reference SNRs with regard to each of the N difference results, and outputting N existence signals indicating that said frequency-selective interference signal exists.

2. A frequency-selective interference signal detecting apparatus according to claim 1, wherein said tone signal generating means comprises:

first tone signal generating means for generating said first tone signal;

second tone signal generating means for generating said N second tone signals; and adding means for adding all of said first tone and N second tone signals and outputting said sum result value.

3. A frequency-selective interference signal detecting apparatus according to claim 1, wherein said tone SNR computing means comprises:

first tone signal-to-noise ratio computing means for inputting signal passed though said transmission channel, detecting said first tone signal, and outputting a first tone signal-to-noise ratio which is a signal-to-noise ratio of a frequency band corresponding to said first tone signal;

second tone signal-to-noise ratio computing means for inputting signal passed through said transmission channel, detecting said N second tone signals, and outputting said N second tone SNRs which are SNRs of the frequency band corresponding to each of said N second tone signals; and subtracting means for subtracting each of said N second tone SNRs from said first tone SNR respectively and outputting said N difference results.

4. A frequency-selective interference signal detecting apparatus according to claim 3, wherein said frequency-selective interference signal detecting apparatus further comprises:

amplifying means for amplifying the output of said subtracting means, and outputting the amplified level.

5. A frequency-selective interference signal detecting apparatus according to claim 1, wherein said tone signal generating means can generate said first tone signal and said N second tone signals either simultaneously or sequentially according to characteristics of said transmission system.

6. A frequency-selective interference signal detecting method for use in a transmission system including:

transmission means for inputting and modulating a data signal for transmission and outputting said modulated signal; a transmission channel through which an output of said transmission means passes; and receiving means for inputting a signal passed through said transmission channel, demodulating the signal as the original data signal, and outputting the demodulated data signal, said frequency-selective interference signal detecting method comprising the sequential steps of:

generating first tone signal and N second tone signals corresponding to the N frequency-selective interference signals respectively;

first determining whether the frequency-selective interference signal is one;

first combining said first tone signal and all said second tone signals if said first determining step is satisfied;

generating the rest of said second tone signal if the first determining step is not satisfied;

proceeding to said second tone signal generating step if all said second tone signals are not generated and otherwise proceeding to said first combining step;

second determining continuously whether said first and N second tone signals are transmitted to said transmission channel after said first combining step;

second combining said modulated signal with said first and N second tone signals when said tone signals are transmitted and transmitting the combined signal to said transmission channel;

first computing a first tone SNR corresponding to said first tone signal from signals passed through said transmission channel;

second computing N second tone SNRs corresponding to said N second tone signals form signals passed through said transmission channel;

subtracting said N second tone SNRs from said first tone SNR respectively and obtaining N difference SNRs; and third comparing said N difference SNRs with preestablished N reference values respectively and generating N existence signals indicating whether said frequency-selective interference signal exists.

* * * * *